(12) United States Patent
Doemen

(10) Patent No.: US 7,023,119 B2
(45) Date of Patent: Apr. 4, 2006

(54) DEVICE COMPRISING A PLAIN BEARING

(75) Inventor: Benno Doemen, St. Georgen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 106 days.

(21) Appl. No.: 10/484,976

(22) PCT Filed: Jul. 18, 2003

(86) PCT No.: PCT/EP03/07846

§ 371 (c)(1),
(2), (4) Date: Jan. 26, 2004

(87) PCT Pub. No.: WO2004/020850

PCT Pub. Date: Mar. 11, 2004

(65) Prior Publication Data
US 2004/0189125 A1    Sep. 30, 2004

(30) Foreign Application Priority Data
Aug. 30, 2002 (DE) .................. 202 13 404 U.

(51) Int. Cl.
H02K 7/09    (2006.01)

(52) U.S. Cl. .................... 310/90.5; 384/129
(58) Field of Classification Search .............. 310/90.5; 384/129; 148/301
See application file for complete search history.

(56) References Cited

U.S. PATENT DOCUMENTS

| | | | |
|---|---|---|---|
| 3,746,407 A | * | 7/1973 | Stiles et al. .................. 384/133 |
| 3,845,339 A | * | 10/1974 | Merkle et al. ......... 310/156.34 |
| 3,934,950 A | | 1/1976 | Kuhlmann |
| 4,536,230 A | * | 8/1985 | Landa et al. ................. 148/301 |
| 4,737,673 A | | 4/1988 | Wrobel |
| 4,955,791 A | | 9/1990 | Wrobel |
| 5,236,784 A | * | 8/1993 | Kobayashi et al. ......... 428/408 |
| 5,821,655 A | * | 10/1998 | Tokushima et al. ........... 310/90 |
| 5,864,303 A | * | 1/1999 | Rosen et al. ........... 340/870.37 |
| 5,872,409 A | | 2/1999 | Jung |
| 6,133,660 A | * | 10/2000 | Suzuki et al. ................. 310/90 |

(Continued)

FOREIGN PATENT DOCUMENTS

DE    25 27 104 A1    1/1976

(Continued)

Primary Examiner—Joseph Waks
(74) Attorney, Agent, or Firm—Milton Oliver, Esq.; Ware Fressola Van Der Sluys & Adolphson LLP

(57) ABSTRACT

A motor, suitable for driving a fan, features a plain bearing (36) that contains ferromagnetic material and serves for radial support of a rotor shaft (34) made of ferromagnetic material. The shaft (34) is arranged rotatably and axially displaceably in that plain bearing (36), and has a free end (35). Provided at the free end is a thrust bearing which has a dome-shaped end (66) provided at that free end (35), and a contact member (68, 69), coacting with the latter dome, the contact member being made at least partially of ferromagnetic material. Also provided is at least one permanent magnet (72) in order to form a magnetic circuit (82) from a first magnet pole (74) via the plain bearing (36), the free shaft end (35) and its dome-shaped end (66), and the contact member (68) to the other magnet pole (76), and thereby to bring about a defined magnetic attractive force between the dome-shaped end (66) and the contact member (68). The magnetic force minimizes rattling of the shaft (34), even in vibration-prone environments.

19 Claims, 2 Drawing Sheets

Figure 1:
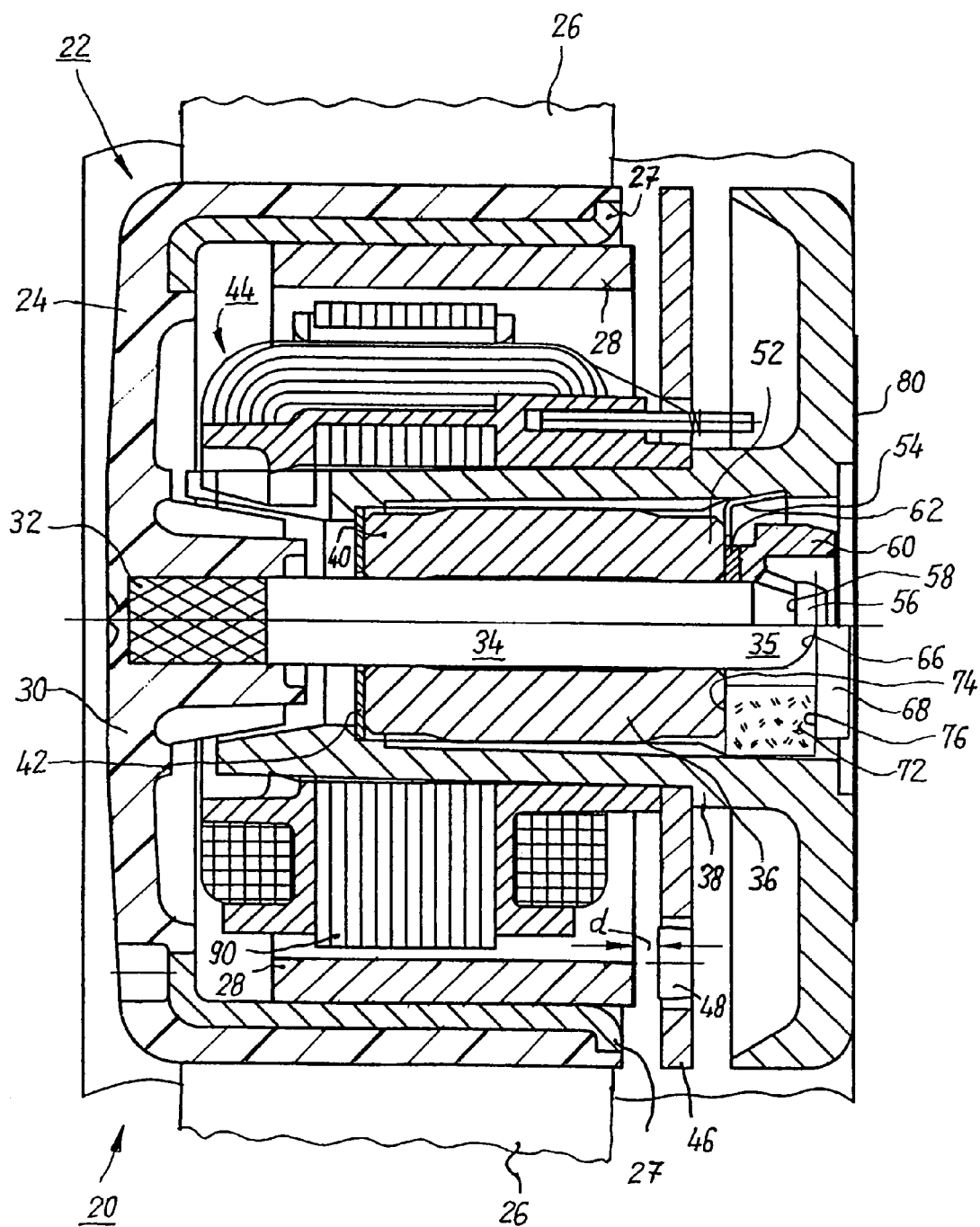

U.S. PATENT DOCUMENTS 6,657,343 B1 * 12/2003 Ichiyama .................. 310/90.5

FOREIGN PATENT DOCUMENTS

| | | |
|---|---|---|
| DE | 26 07 266 A1 | 1/1977 |
| DE | 27 41 062 A1 | 3/1979 |
| DE | 35 28 121 A1 | 2/1987 |
| DE | 37 31 710 A1 | 3/1998 |
| DE | 197 56 927 C1 | 4/1999 |
| DE | 199 10 872 A1 | 9/1999 |
| GB | 2201841 A * | 9/1988 |
| GB | 2 335 242 A | 9/1999 |
| JP | 57160346 A * | 10/1982 |
| JP | 06341434 A * | 12/1994 |
| JP | 10292819 A * | 11/1998 |

* cited by examiner

DEVICE COMPRISING A PLAIN BEARING

This application is a section 371 of PCT/EP03/07846, filed 18 Jul. 2003, claiming priority from German Patent application 202 13 404, filed 30 Aug. 2002 and incorporates by reference the entire contents thereof.

FIELD OF THE INVENTION

The invention concerns an arrangement having a plain bearing that contains ferromagnetic material, in particular sintered iron, and that serves for radial support of a shaft made of ferromagnetic material.

BACKGROUND

When a shaft is supported in a radial plain bearing, it always has an axial play, i.e. its axial position is not precisely defined. This axial play can be restricted by limiters. These limiters can take the form, for example, of steps on the shaft, or shaft rings. When these rest against an end face of a plain bearing bushing, they generate an additional frictional torque; and if such solutions are used in drive units with a varying utilization position or orientation, the axial play that is (still) present allows rattling. (The term "utilization position" refers to the position, e.g. horizontal or vertical, assumed by the motor during operation.)

In plain bearings with a vertical or almost vertical shaft position, so-called thrust bearings have proven successful. In these, the dead weight of the rotor presses via a dome-shaped shaft end onto a planar bearing disk and onto a small area thereon; and because of the small radius of the shaft end, only a relatively small frictional loss torque is generated and the axial shaft position is defined, but only if the drive unit is mounted in the intended utilization position or orientation.

SUMMARY OF THE INVENTION

It is an object of the invention to make available a new arrangement of the kind cited above.

According to the invention, this object is achieved by bringing about a defined magnetic attractive force between a bearing dome and a contact member, by providing a permanent magnet near a free end of the ferromagnetic shaft, and forming a magnetic circuit from one pole of the permanent magnet via the plain bearing, the free shaft end, the bearing dome, and the contact member, back into the other pole of the permanent magnet. In this, a variety of ferromagnetic elements, most of which are present anyway, are used, in conjunction with at least one axially magnetized permanent magnet, to create a magnetic circuit through the thrust bearing. A defined magnetic attractive force between the dome-shaped shaft end and the contact member is thereby obtained, and depending on the size and strength of the permanent magnet used, that attractive force can be defined by the designer when dimensioning the thrust bearing.

It is thereby possible, for example in the case of fans with an arbitrary utilization orientation (horizontal, vertical, etc.), to make available, in low-loss fashion, a force which guarantees that a thrust bearing will function as described above in any utilization orientation with zero play, i.e. without rattling. A thrust bearing of this kind can, if applicable, handle the dead weight of the rotor and optionally also other forces acting in the axial direction, as will become evident from the description below.

The plain bearing is preferably arranged in a bearing support tube that is joined to the internal stator of an external-rotor motor. This permits a simple and compact design. In another preferred development of the invention, the shaft is joined at its one end to the base of the external rotor, resulting in simple journalling of that external rotor.

In a very advantageous embodiment, the axially magnetized permanent magnet is implemented as a ring magnet that is magnetized substantially in the direction of its longitudinal axis. This allows a compact design. When a large magnetic attractive force between bearing dome and contact member is desired, it is advantageous to use a preferred-orientation ceramic ring magnet, which has particularly advantageous magnetic properties and thus allows a large magnetic attractive force to be generated.

BRIEF FIGURE DESCRIPTION

Figure 2:
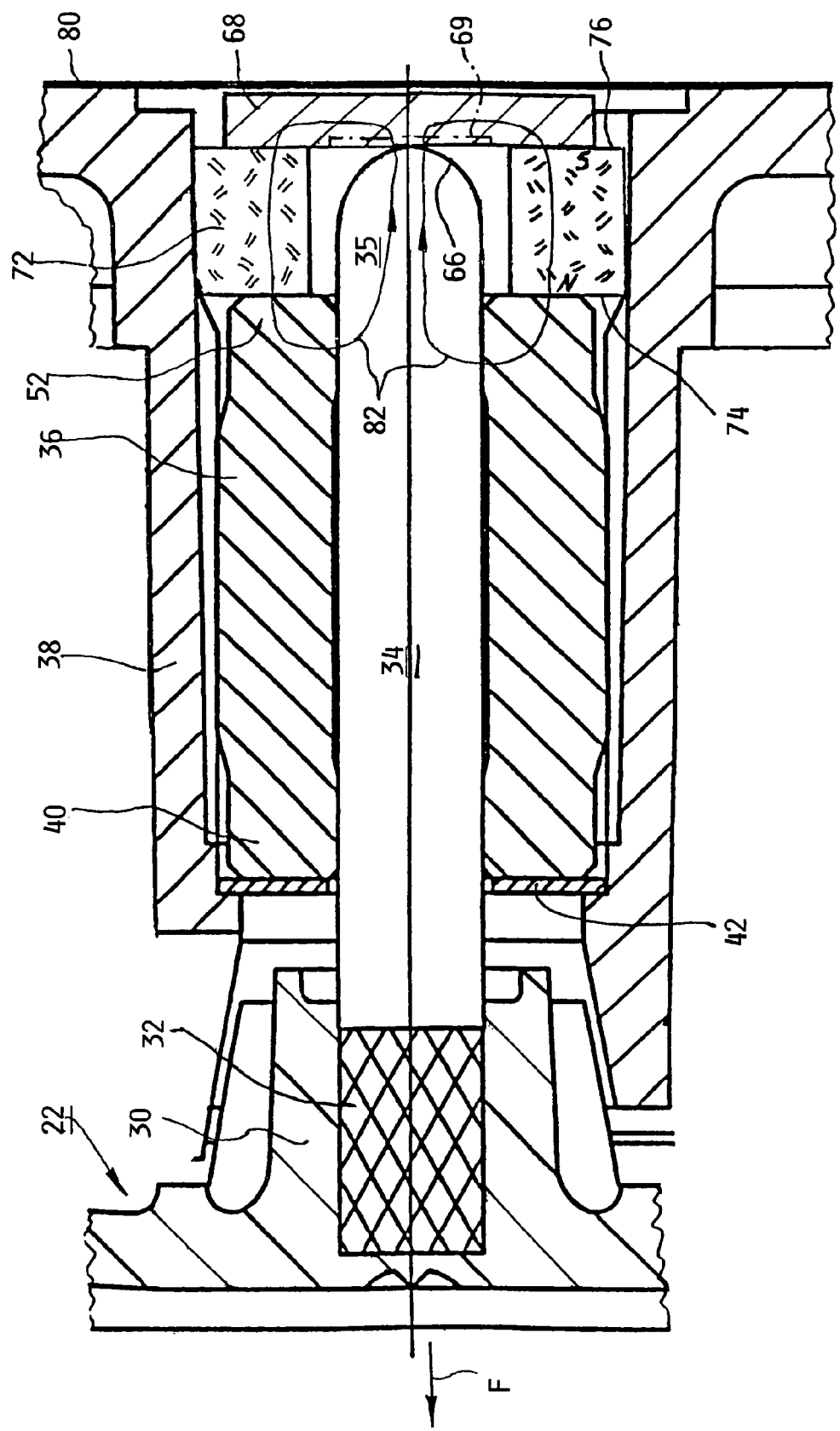

Further details and advantageous embodiments of the invention are evident from the exemplary embodiment, in no way to be understood as a limitation of the invention, that is described below and depicted in the drawings, in which:

FIG. 1 is a greatly enlarged longitudinal section through an external-rotor motor that serves to drive a fan and that is equipped with an arrangement according to the present invention; and FIG. 2 shows an even further enlarged portion of FIG. 1.

DETAILED DESCRIPTION

FIG. 1 is a longitudinal section, enlarged approximately five times, through an external-rotor motor 20 of ordinary design that is preferably used to drive very small fans. Motor 20 has an external rotor 22 having a rotor cup 24 made of plastic, on whose outer periphery are provided fan blades 26 of an axial fan that, in operation, either pull rotor 22 to the left or push it to the right with reference to FIG. 1, depending on the rotation direction.

A magnetic armature element 27 made of soft iron is mounted in rotor cup 24, and a radially magnetized rotor magnet 28, which e.g. can be magnetized in four-pole fashion, is mounted on the element's inner side.

Rotor cup 24 has a base 30 in which is mounted, by plastic injection, a fluted upper shaft end 32 of a rotor shaft 34 whose lower, free shaft end is labeled 35.

A plain bearing 36 which contains ferromagnetic material, preferably sintered iron, serves for radial support of shaft 34. This bearing is mounted in the interior of a bearing support tube 38 by being pressed in, and rests with its left (in FIG. 1) end 40 against an annular disk 42, arranged in bearing support tube 38, through which shaft 34 projects.

Mounted on the outer side of bearing support tube 38 is internal stator 44 of motor 20, as well as a circuit board 46 in which, as depicted, is mounted a Hall IC 48 that is controlled by the leakage field of rotor magnet 28; distance d between rotor magnet 28 and Hall IC 48 is therefore critical, and should be as small as possible and not fluctuate. For this reason, it is important for shaft 34 to assume a constant axial location relative to bearing support tube 38 and, if possible, to be retained in that location.

The axial location of shaft 34 is difficult to secure because in subminiature fans, shaft 34 has a diameter on the order of only 1 to 3 mm; mechanical retention is thus very difficult and can in fact be impossible for small diameters, since shaft 34 then has a diameter equal only to that of a sewing needle.

A conventional type of retention is shown in the upper part of FIG. 1. Lower end 52 of plain bearing 36 is secured here by a prong ring 54 whose prongs dig into the inner side of bearing support tube 38 upon assembly, and lock in there.

In this existing version, shaft 34 has at its end region 56 an annular groove 58 into which a holding member 60 is latched. The latter's left (in FIG. 1) side supports an annular disk 62 that lies between that left end and right end 52 of plain bearing 36 and serves to reduce frictional losses at this point.

This type of mounting serves simultaneously as an axial bearing and axial retainer for shaft 34, but weakens shaft 34 as a result of annular groove 58.

FIG. 1 shows at the bottom an arrangement according to the invention, which is also depicted (at greatly enlarged scale) in FIG. 2.

With this approach, shaft 34 is equipped in the region of its free end 35 with a so-called bearing dome 66, i.e. a smooth, rounded end that rests against a contact member 68 made of a ferromagnetic material, e.g. a disk of sintered iron or a steel disk. Bearing dome 66 forms, with this contact member 68, an axial plain bearing that is also referred to as a "thrust bearing."

A thin layer 69 (preferably 0.2 to 0.3 mm) of a suitable plastic having a low coefficient of friction, e.g. hardened PTFE (PolyTetraFluoroEthylene, frequently referred to by the trademark TEFLON), is preferably inserted between bearing dome 66 and contact member 68, so that bearing dome 66 rests against that layer 69. Layer 69 is preferably located only at the center of contact member 68, and does not extend as far as ring magnet 72 (see FIG. 2).

Located between the right (in FIG. 2) end 52 of radial plain bearing 36 and contact member 68 is an axially magnetized ring magnet 72, preferably a preferred-orientation ("anisotropic") ceramic ring magnet. Its left (in FIG. 2) end surface 74 and right end surface 76 are ground to an exact distance from one another, while rough tolerances are permissible for the inside and outside diameter. These end surfaces 74, 76 represent the poles of ring magnet 72.

Ring magnet 72 rests with its end surface 74 against side 52 of plain bearing 36. Resting against the radial inner part of its end surface 76 is the ferromagnetic contact member 68, which is thus retained by ring magnet 72 on plain bearing 36. If the latter is pressed sufficiently firmly into bearing support tube 38, that is sufficient retention for parts 68 and 72. Otherwise, they can be additionally secured in bearing support tube 38 by means of a prong ring (analogous to prong ring 54). Retention is also obtained from an adhesive plate 80 made of metal, which covers the lower opening of bearing support tube 38 and serves as an identification plate.

As FIG. 2 shows particularly well, contact member 68 should preferably have a somewhat smaller outside diameter than ring magnet 72 in order to prevent, if possible, the creation of leakage fields at the outer rim of contact member 68. FIG. 2 furthermore schematically shows flux lines 82 in a magnetic circuit. If it is assumed that a north pole is present at end surface 74 of ring magnet 72, field lines 82 thus proceed from there through plain bearing 36 to shaft 34, and through the latter via bearing dome 66 and contact member 68 back to the south pole on end surface 76 of ring magnet 72. Ring magnet 72 could of course also be polarized in reverse; i.e. its polarization is irrelevant, which simplifies assembly. The thin plastic layer 69 acts in this magnetic circuit 82 as a small air gap, but does not result in any substantial reduction in the attractive force.

Since shaft 34 is axially displaceable to at least a limited extent in plain bearing 36, rotor 22 is very easy to assemble: shaft 34 is inserted into plain bearing 34, and is there attracted by ring magnet 72 and pressed against contact member 68.

An advantage of the invention is that parts that are present anyway are mostly used to constitute the magnetic circuit indicated by field lines 82, so that additional costs are incurred only for ring magnet 72. No pole-switching losses occur in shaft 34, since the magnetic flux in shaft 34 does not change its magnitude or direction. The field lines from permanent magnet 72 through sintered bearing 36 to shaft 34 are cut by shaft 34 during rotation, so that electrical voltages are induced in the shaft surface. These voltages are, however, small, due to the small diameter of shaft 34, and, because of the relatively high specific resistance of the hard steel shaft, result in only very minor eddy current, i.e. only very small losses.

Relatively large holding forces can be generated with the invention. In a laboratory specimen approximately one-fifth the size of motor 20 according to FIG. 1, rotor 22 was pulled away from ring magnet 72 with a force F in a horizontal position (i.e. as depicted in FIG. 2). Bearing dome 66 remained in contact with contact member 68 up to a force F=320 g=3.1 N. Shaft 34 in this instance had a diameter of 3 mm. Ring magnet 72 had a length of 9 mm, an outside diameter of 8.5 mm, and an inside diameter of 4.2 mm. Since rotor 22 had a weight of 22 grams, in such an arrangement thrust bearing 66, 68 will remain closed at an acceleration of up to approximately ten times that of Earth's gravity, and will not rattle.

This makes it possible to compensate for forces that act on rotor 22, for example its own weight, if motor 20 is installed in such a way that rotor 22 hangs downward; or a force generated as a reaction force by blades 26 when the air flow is generated; or a force that results from an asymmetrical position of rotor magnet 28 relative to lamination stack 90 of stator 44, and that acts toward the left in FIG. 1 because rotor magnet 28 is trying to assume a symmetrical position relative to lamination stack 90; and lastly, as explained, acceleration forces up to a specific value.

The invention is particularly suitable for utilization in vehicles of all kinds, where considerable accelerations can occur and quiet operation is nevertheless required. This applies in particular to small external-rotor motors that serve to drive fans or the like. Such motors often have very small dimensions, and the invention makes it substantially simpler to support their rotors so that no rattling occurs in the region of the thrust bearing.

Many variants and modifications are of course possible within the scope of the present invention. When there is no need to generate large axial forces, a thin-walled ring magnet 72 can be used or one or more individual magnets can be used. Contact member 68 can also be implemented in such a way that it has pole shoes for contact against ring magnet 72, or it can be adhesively bonded to one or more bar magnets and inserted into bearing support tube 38 upon assembly. Such modifications, or similar ones, are within the scope of the present invention. The invention can also be used with other types of motor, e.g. in so-called coreless motors. In particular those having a flat air gap.

The invention claimed is:

1. An arrangement comprising
   a plain bearing (36) that contains sintered ferromagnetic material, and that serves for radial journaling of
   a shaft (34) made of ferromagnetic material, which shaft (34) is arranged rotatably and axially displaceably in that plain bearing (36) and has a free end (35);

an axial bearing, provided at that free end (35), which comprises a dome-shaped ending (66) of that free end and a contact member (68, 69), coacting with the dome-shaped ending, said contact member being made at least partially of ferromagnetic material; and at least one permanent magnet (72) that is arranged in a region around the free shaft end (35) between the axial end of the plain bearing (36) there and the contact member (68), in order to bring about a magnetic circuit (82) from one pole (74) of the at least one permanent magnet (72) via the plain bearing (36), the free shaft end (35) and the dome-shaped ending (66), and the contact member (68) to the other pole (76) of the at least one permanent magnet (72), to thereby to bring about a defined magnetic attractive force between the dome-shaped ending (66) and the contact member (68).

2. The arrangement according to claim 1, which is implemented as part of an external-rotor motor (20), the plain bearing (36) being arranged in a bearing support tube (38) to which an internal stator (44) of that motor (20) is joined.

3. The arrangement according to claim 2, wherein the shaft (34) is mounted, with its end region (32) facing away from the free end (35), at the base of a cup-like external rotor part (24) of said motor (20).

4. The arrangement according to claim 3, wherein the permanent magnet (72), provided in order to generate a magnetic attractive force, is magnetized substantially parallel to the axial direction of the shaft (34).

5. The arrangement according to claim 2, wherein the permanent magnet (72), provided in order to generate a magnetic attractive force, is magnetized substantially parallel to the axial direction of the shaft (34).

6. The arrangement according to claim 1, wherein said permanent magnet (72) is magnetized substantially axially and is implemented as a ring magnet (72) that is magnetized approximately in a direction parallel to its longitudinal axis.

7. The arrangement according to claim 6, wherein the ring magnet (72) is guided with its outer periphery abutting the bearing support tube (38).

8. The arrangement according to claim 7, wherein the ring magnet is implemented as a preferred-orientation ceramic ring magnet (72).

9. The arrangement according to claim 8, wherein the permanent magnet (72), provided in order to generate a magnetic attractive force, is magnetized substantially parallel to the axial direction of the shaft (34).

10. The arrangement according to claim 7, wherein the permanent magnet (72), provided in order to generate a magnetic attractive force, is magnetized substantially parallel to the axial direction of the shaft (34).

11. The arrangement according to claim 6, wherein the ring magnet is implemented as a preferred-orientation ceramic ring magnet (72).

12. The arrangement according to claim 11, wherein the permanent magnet (72), provided in order to generate a magnetic attractive force, is magnetized substantially parallel to the axial direction of the shaft (34).

13. The arrangement according to claim 6, wherein the permanent magnet (72), provided in order to generate a magnetic attractive force, is magnetized substantially parallel to the axial direction of the shaft (34).

14. The arrangement according to claim 1, wherein the permanent magnet (72), provided in order to generate a magnetic attractive force, is magnetized substantially parallel to the axial direction of the shaft (34).

15. The arrangement according to claim 1, wherein a contact surface (69) made of plastic is provided, in the region where the dome-shaped ending (66) rests against the contact member (68), on the latter.

16. The arrangement according to claim 15, wherein the contact surface (69) comprises a low-friction plastic.

17. The arrangement according to claim 16, wherein said low-friction plastic comprises polytetrafluoroethylene (PTFE).

18. The arrangement according to claim 16, wherein the contact surface (69) is dimensioned sufficiently thinly to avoid creating a magnetically effective air gap in a transition region from the contact member (68) to the permanent magnet (72).

19. The arrangement according to claim 15, wherein the contact surface (69) is dimensioned sufficiently thinly to avoid creating a magnetically effective air gap in a transition region from the contact member (68) to the permanent magnet (72).

* * * * *

UNITED STATES PATENT AND TRADEMARK OFFICE
CERTIFICATE OF CORRECTION

| | | |
|---|---|---|
| PATENT NO. | : 7,023,119 B2 | Page 1 of 1 |
| APPLICATION NO. | : 10/484976 | |
| DATED | : April 4, 2006 | |
| INVENTOR(S) | : Doemen | |

It is certified that error appears in the above-identified patent and that said Letters Patent is hereby corrected as shown below:

In column 4, line 59, delete "motors. In particular" and substitute --motors, in particular--

Signed and Sealed this

Eighth Day of May, 2007

JON W. DUDAS
*Director of the United States Patent and Trademark Office*